United States Patent [19]

Yu-Shu

[11] Patent Number: 5,394,968
[45] Date of Patent: Mar. 7, 1995

[54] CLUTCH APPLIED BETWEEN TRANSMISSION SHAFT AND WHEEL OF AN ELECTRIC CART

[76] Inventor: Lin Yu-Shu, 7F, No. 2-1, Lane 130, Shing-Yi Road, Pei Tou, Taipei,

[21] Appl. No.: 64,488

[22] Filed: May 19, 1993

[51] Int. Cl.$^6$ ............................ F16D 11/00; F16D 1/08
[52] U.S. Cl. ............................... 192/67 R; 192/89.27; 403/1
[58] Field of Search ....................... 192/67 R, 67 P, 50, 192/95, 89.27, 49; 403/1; 301/1

[56] References Cited

U.S. PATENT DOCUMENTS

| | | | |
|---|---|---|---|
| 256,842 | 4/1882 | Lehmann | 403/1 X |
| 949,179 | 2/1910 | Gilbert | 192/50 |
| 2,635,727 | 4/1953 | Bitler | 192/67 R |
| 2,844,238 | 7/1958 | Peterson | 192/67 R |
| 3,050,321 | 8/1962 | Howe et al. | 403/1 |
| 3,125,363 | 3/1964 | Kapusta | 192/67 R X |
| 3,184,258 | 5/1965 | Kapusta | 192/67 R X |
| 3,198,923 | 8/1965 | Tripp | 192/95 X |
| 3,251,630 | 5/1966 | Astley | 192/67 P X |
| 3,351,364 | 11/1967 | Warn et al. | 192/67 R X |
| 4,512,613 | 4/1985 | Nassiri | 301/1 |

FOREIGN PATENT DOCUMENTS 17903  7/1914  United Kingdom ................ 192/50

*Primary Examiner*—Rodney H. Bonck
*Attorney, Agent, or Firm*—W. Wayne Liauh

[57] ABSTRACT

A clutch to be applied between a transmission shaft and a wheel of an electric cart, comprising a bushing for fixing to the shaft and a hub rotatably covered on the bushing, wherein the hub is adapted to have the wheel securely mounted thereto. A collar is mounted on the outer ends of the bushing and the hub to engage the bushing with the hub. The hub and the bushing, which are concentric annuluses, have matching slots on their outer ends, respectively, and the collar is provided with matching collar protrusions for engagement therewith. A stud is cased within the collar and secured to the outer end of the transmission shaft via a screw, which also slidably secures the collar to the shaft via a spring which sits on the shoulder in the inner wall of the collar. The hub can be easily disengaged from the bushing by simply pulling the collar and compressing the spring and rotating the collar so that the protrusions are no longer aligned with the slots and sit on the outer face of the hub and the bushing.

5 Claims, 6 Drawing Sheets

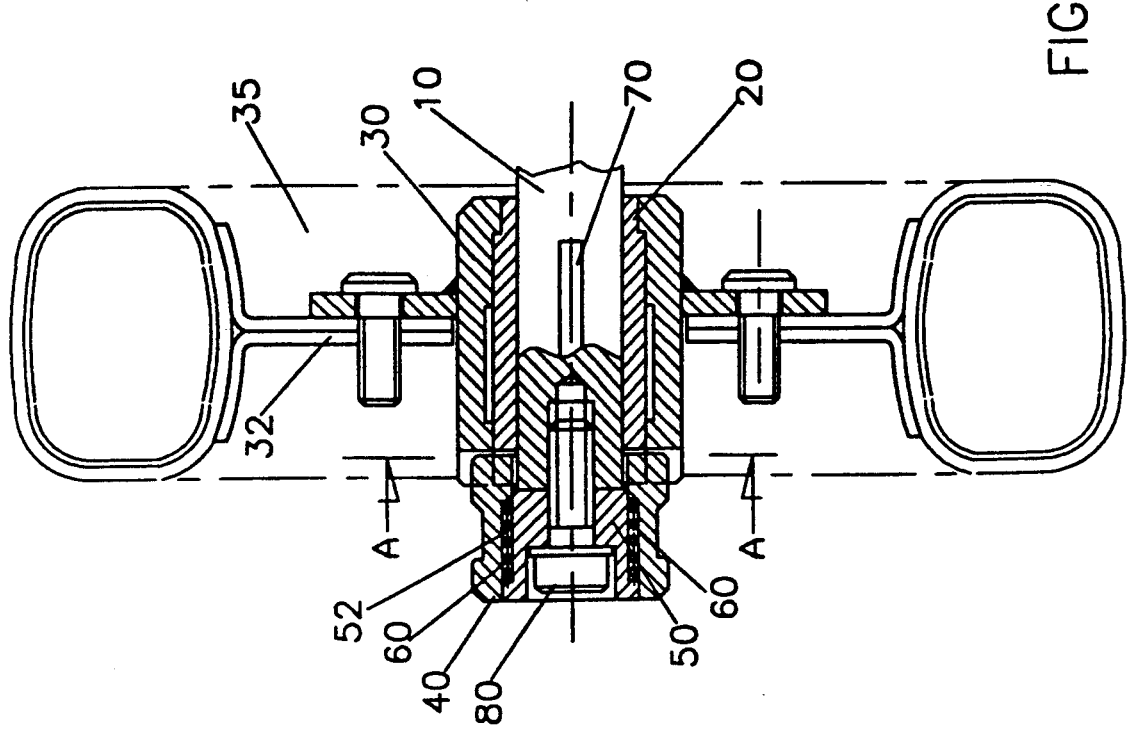
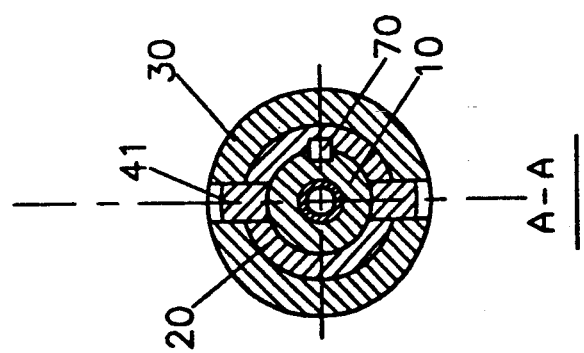
FIG 2
FIG 2A

CLUTCH APPLIED BETWEEN TRANSMISSION SHAFT AND WHEEL OF AN ELECTRIC CART

FIELD OF THE INVENTION

This invention relates to a clutch which is applied between the transmission shaft and the wheel, and particularly to a clutch which is of simple structure and allows quick disengagement, and especially suitable for application between the transmission shaft and the wheel of an electric car.

BACKGROUND OF THE INVENTION

In general most of electric cars which are driven with electric power are designed with an electromagnetic brake. More specifically, they are running by means of the transmission wheels which are driven by the transmission mechanism driven with electric power supplied from the battery. Notwithstanding, once the power source of an electric car is switched off, the electromagnetic brake will lock up the wheels as a result of power being turned off whereby the electric car is not allowed to move. The most often way of moving an electric car with power off lies in providing small amount of current passing through the electromagnetic brake allowing the release of the wheels from the electromagnetic brake. Nevertheless, because the motor, chain, and gear of the transmission mechanism remain engaged with the wheels, a considerable amount of resistance still exists resulting in difficult moving. For solving the problem, the optimal way is to mount a clutch on the transmission mechanism allowing for the disengagement of the transmission shaft from the wheels once the power source of an electric car is switched off whereby the wheels will become disengaged allowing the car to be moved by pushing. Notwithstanding, all the kinds of clutches at present are not suitable for an electric car. Referring to FIG. 1A and 1B, these two jaw type clutches are mounted in the intermediate portion of the transmission shaft but they are suitable for engagement and disengagement between the shafts. In general these two type clutches are usually mounted within a car while a complex mechanism is needed for the control of the clutch engagement or disengagement whereby the transmission mechanism can not be constructed in a simple manner.

SUMMARY OF THE INVENTION

Therefore it is an object of this invention to provide a clutch for application between the transmission shaft and the tires.

Another object of this invention is to provide a clutch which is particularly suitable for the application between the transmission shaft add the tires of an electric car.

Another object of this invention is to provide a clutch allowing for the application of easy engagement/disengagement between the transmission on shaft and the wheels.

These and other objects and advantages of this invention will become apparent to those skilled in the art after considering the following detailed specification together with the accompanying drawings.

BRIEF DESCRIPTION OF THE DRAWINGS

FIG, 1A is a view of a jaw type clutch often used,

FIG. 2 is a view showing the assembly of this invention.

FIG. 2A is a cross-sectional view along line A—A of the assembly of this invention shown in FIG. 2.

DETAILED DESCRIPTION OF PREFERRED EMBODIMENT

Figure 1A:
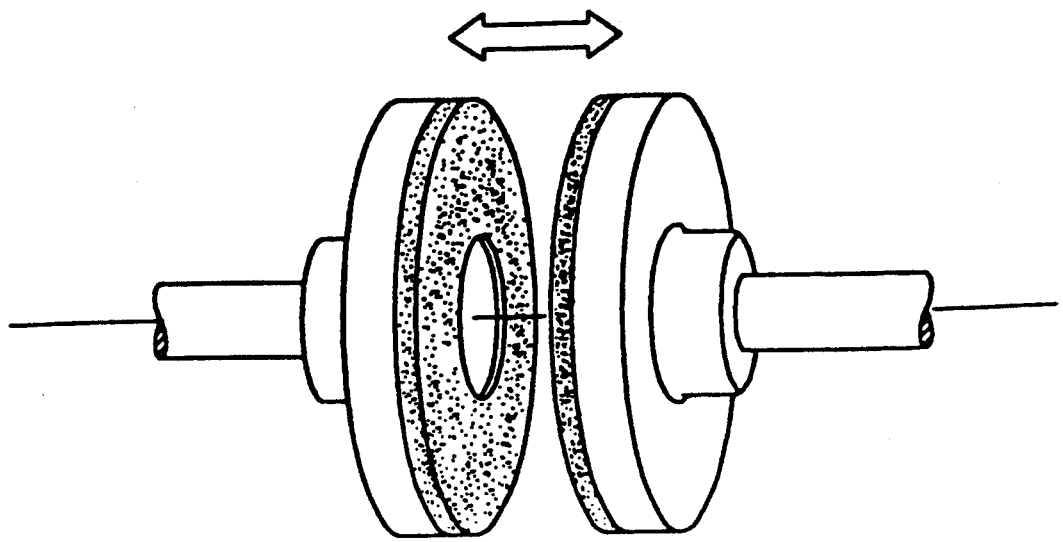
FIG. 1B is a view of another jaw type clutch often used.
Figure 1B:
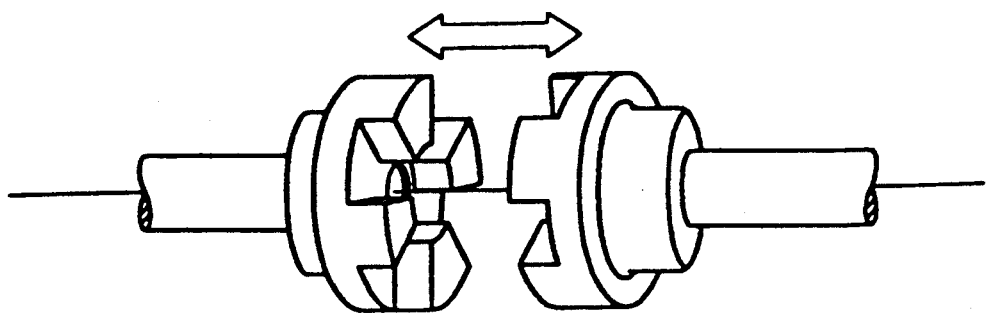

Referring to FIG. 2, this invention comprises a transmission shaft 10 and a bushing 20 for engaging with the shaft 10; a hub 30 is rotably covered on the bushing 20; the hub 30 has a transmission wheel 35 securely mounted thereto; and a collar 40 is movably mounted on the top end between the bushing 20 and the hub 30; and a stud 50 is cased within the collar 40 and secured to the final end of the hub 30 by means of a screw, and spring 60 is mounted between the stud 50 and the inner hole of the collar 40. With the match of a plurality of protrusions 41 on the collar 20 with the slots 21, 31 on the hub, the collar 40 can easily engage or disengage with the hub 30 to accomplish easy engagement or disengagement between the transmission shaft and the tire.

Figures 4A, 4B:
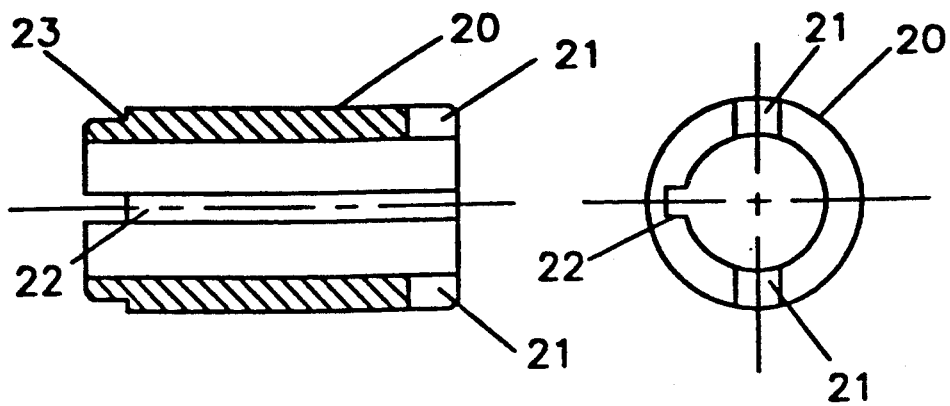
FIG. 4A is a cross-sectional view across the center of a bushing and cutting through the two slots according to this invention.
FIG. 4B is a top view of a bushing according to this invention.

Referring to FIGS. 4A and 4B, the bushing 20 resembles a hollow cylindrical shape and its outer end has several slots 21 and its inner end resembles a step type shoulder 23. Also the internal wall of the bushing 20 has key way 22 and is mounted on the transmission shaft 10 securely by means of a retaining key 70 (as shown in FIG. 2 and 2A) allowing to cover a hub 30 for driving the wheel.

Figure 3A:
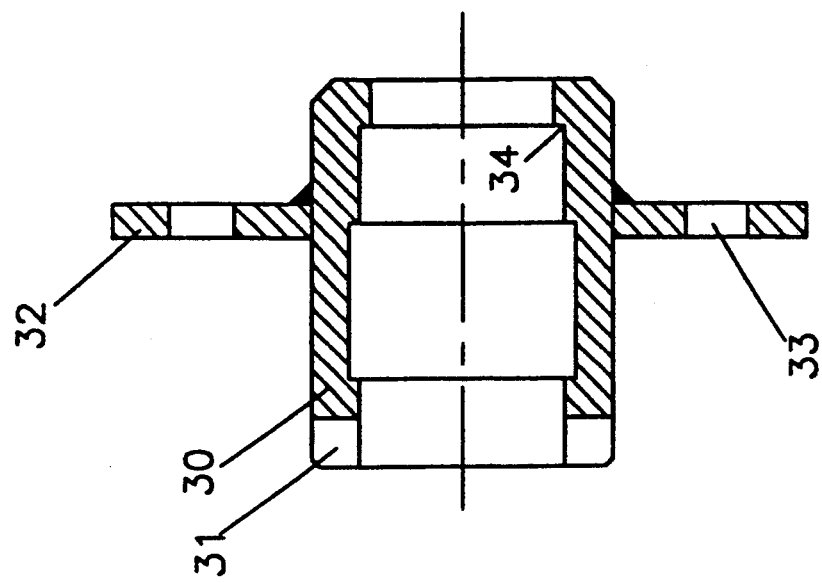
FIG. 3A is a side view of a hub according to this invention.
Figure 3B:
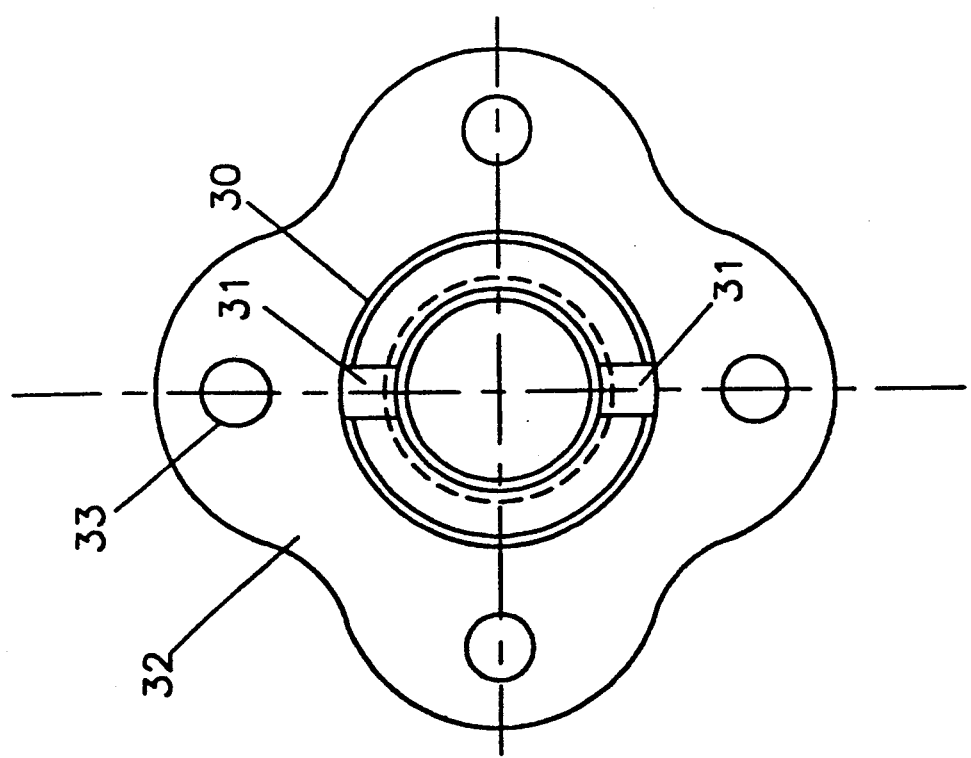
FIG. 3B is a top view of a hub according to this invention.

Referring to FIGS. 3A and 3B, the hub 30 resembles a hollow cylindrical shape and at appropriate portion on the perimeter has a ring flange 32 that has a proper number of through holes 33 for the wheel rim to be mounted securely thereon, so that the wheel can be mounted on the hub 30 securely. The inside diameter of the hub 30 is roughly equal to the outside diameter of the bushing 20. To match the appearance of the bushing 20, the inside hole of the hub 30 is made into a step shape with cascadingly different diameters and its inner end forms a stop 34. The hub 30 is rotably covered on the bushing 20 and the shoulder 23 of the bushing 20 is laid tightly against the stop 34 of the hub (See FIG. 3A) to ensure that the hub 30 will not break away. The top end of the hub 30 has a proper number of slots 31 having equal width to that of the slots 21 on the top end of the bushing 20 and located on the corresponding position. Because the slots 31 and the slots 21 are arranged in an aligned manner with respect to each other to allow the collar 40 to set into the slots 21 and 31 for driving the tire.

Figures 5A, 5B:
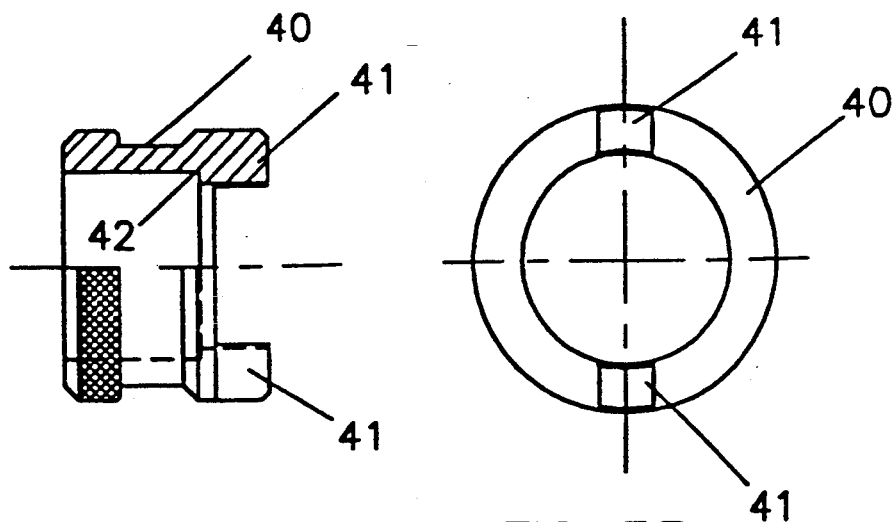
FIG. 5A is a partial revealed view of a collar according to this invention.
FIG. 5B is a top view of a collar according to this invention.

Referring to FIGS. 5A and 5B, the collar 40 resembles a hollow cylindrical shape and is mounted on the outer ends of the bushing 20 and the hub 30 (See FIG. 2), and the inside hole has two sectional stairs to form a vertical shoulder 42. The outer rim of the collar 40 has slots and knurls allowing an easy grasp by the user. The inner end of the collar 40 has a proper number of convex 41 and the dimension of the protrusion is equal to that of the slots 21 and the slots 31 and located on corresponding positions, whereby the protrusion 41 may fit with the slots 21 and the slots 31 mutually. Also the protrusion 41 is tightly pressed upon the slots 21 and the slots 31 by means of a stud 50 and a spring 60.

Figure 6:
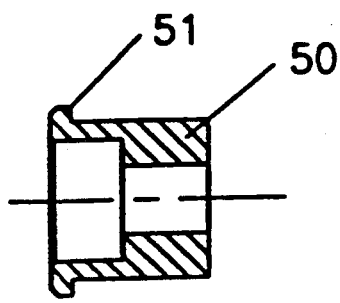
FIG. 6 is a cross-sectional view of a retaining ring according to this invention.

Referring to FIGS. 2 and 6, the stud 50 is cased within the collar 40 and secured to the transmission shaft 10 by means of a screw 80. The top end of the stud 50 has a flange 51. The flange 51 has a size roughly equal to the insider diameter of the collar 40 and is slidably cased in the inner hole of the collar 40. After the stud 50 is cased in the inner hole of the collar there is a spacing 52 left allowing a spring 60 to be placed therewithin. One end of the spring 60 is laid against the flange 51 of the stud and the other end is laid against the shoulder 42 of the collar. With elastic force from 60 to thrust the collar 40, the proper number of convex 41 on the collar will be pressed tightly against the slots 21, 31 respectively on the bushing 20 and the hub 30.

Figure 7:
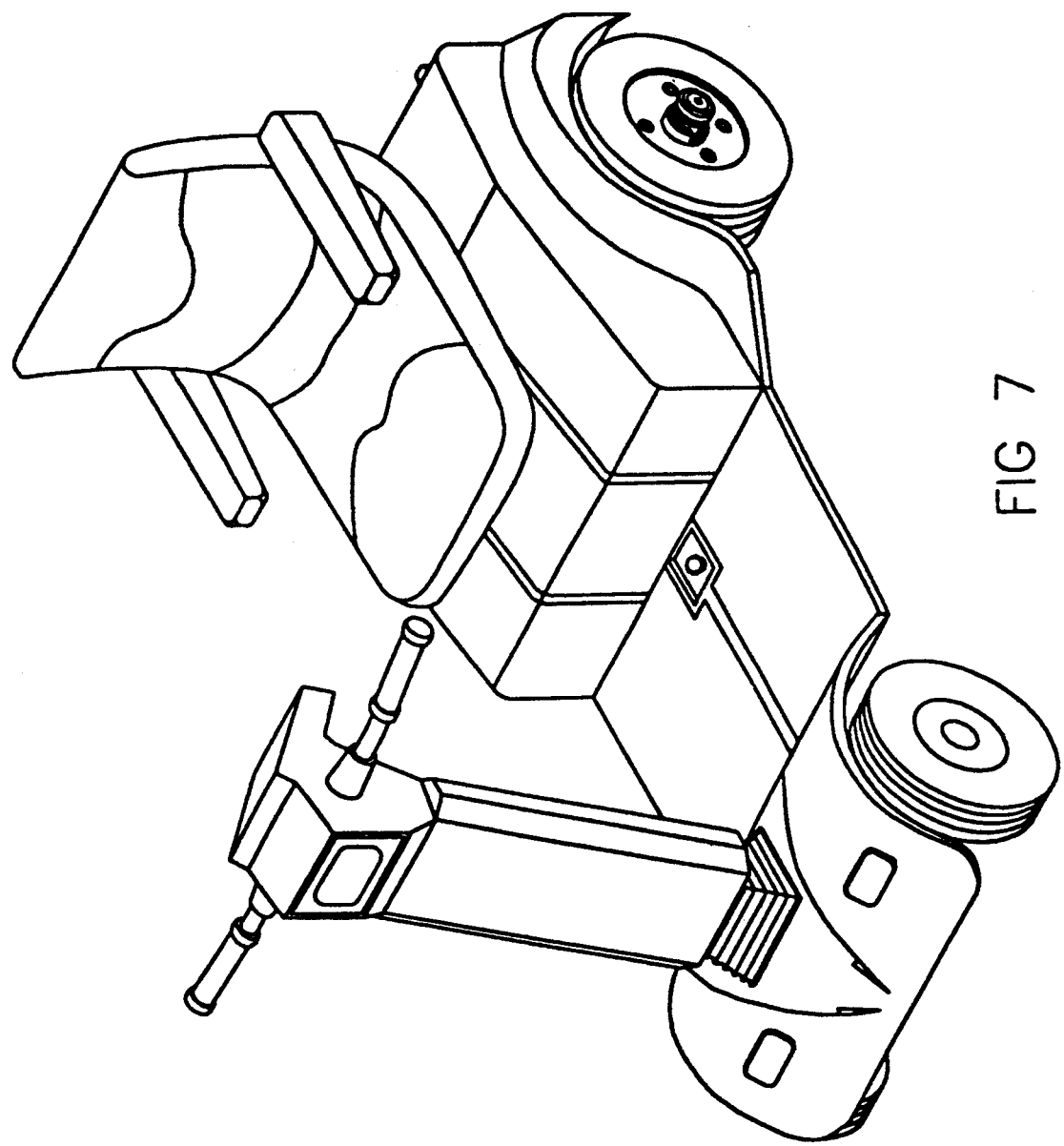
FIG. 7 is an embodiment showing the application of this invention to an electric car.
Figure 8:
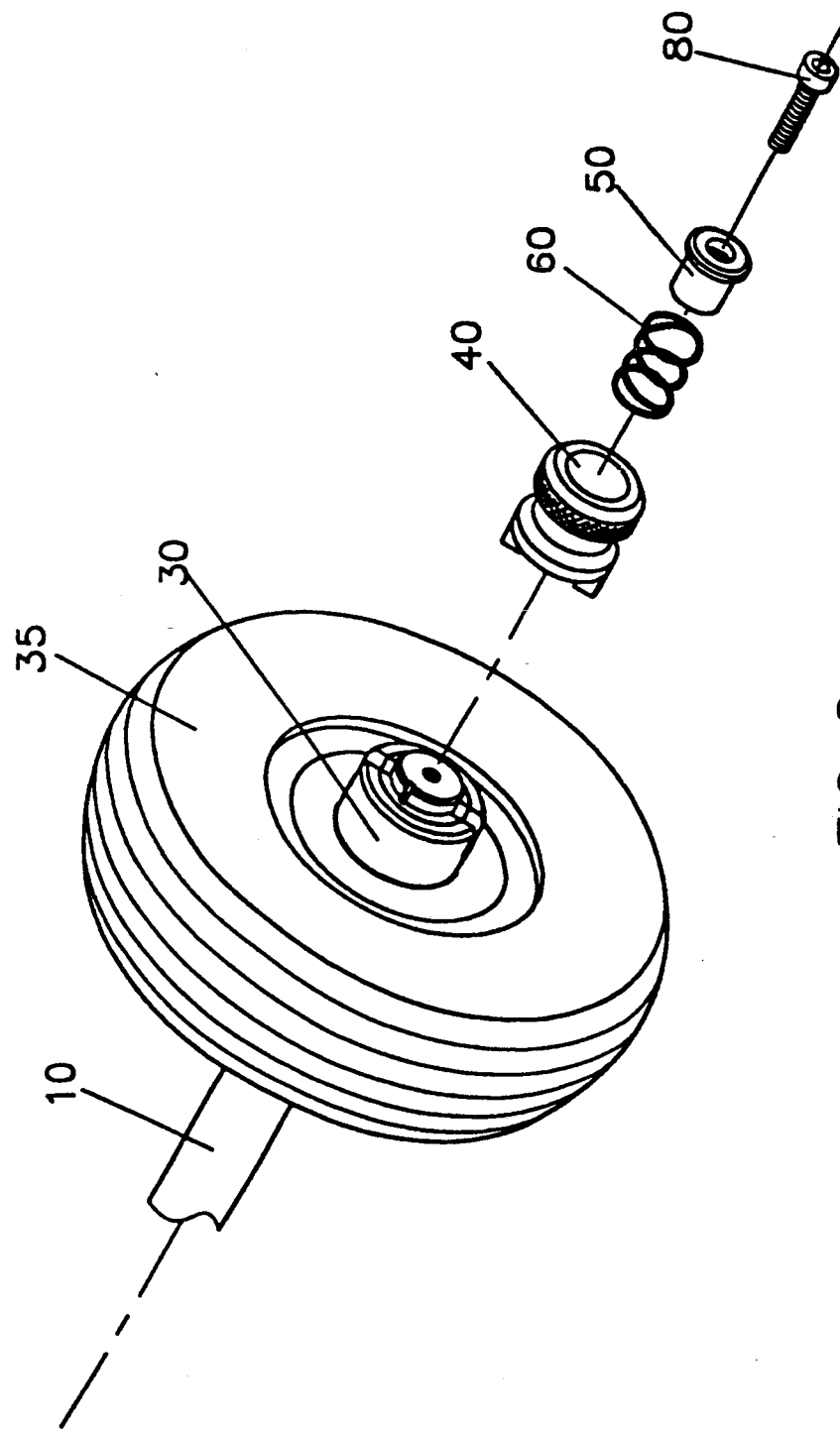
FIG. 8 is an exploded view of FIG. 7.

This invention is particularly suitable for an electric car and the embodiment below will employ an electric car as an example to describe the operating method. This invention is mounted between the transmission shaft and the wheel as shown on FIGS. 7 and 8. When the power source of the electric car is turned on in order to get the wheels driven, the slots on the bushing 20 and and hub 30, respectively, are aligned with each other manner each other. Then the collar 40 is rotated to make the protrusion 41 in align with the slots 21 and 31, insert the protrusion 41 in the slots 21 and 31, with the help of an elastic force from the spring to cause the protrusion 41 laying tightly against the slots 21 and 31, the bushing 20 can be engaged with the hub 30 whereby the transmission shaft 10 may drive the wheels to cause the car to move.

When the power source is turned off and the transmission shaft is disenabled in rotation, pull up the collar 40 and compress down the spring 60 to force the protrusion 41 to disengage with the slots 21 and 31 respectively on the bushing 20 and the hub 30, and then rotate a degree of angle, with the help of elastic force from the spring 60 to force the convex 41 lay tightly against the end face of the bushing 20, the hub 30 may disengage with the bushing 20 and rotate freely on the bushing 20 whereby the wheel becomes disengaged whereby the car can be pushed by hand easily.

Because this invention adopts a match between the protrusion and the slots, the bushing 20 will not slide with respect to the hub 30, whereby power from the transmission shaft can be thoroughly transmitted to the wheels. In addition, the operating procedure is quite easy and engagement/disengagement is quickly accomplished. Further, this invention is constructed of simple structure allowing for easy operation and direct operation with hand to control the engagement or disengagement of the clutch, which is totally different from the conventional clutch, which is mounted on the intermediate portion of the transmission shaft whereby the transmission shaft has to be divided into two sections and a complex mechanism has to be added to control the engagement/disengagement of the clutch and therefore the transmission shaft has become extremely complex. Therefore this invention is effective to simplify the structure of the conventional transmission system.

I claim:

1. A clutch to be placed between a transmission shaft and a wheel of an electric cart for an easy engagement and disengagement therebetween, comprising:
   (a) a bushing having the shape of a hollow cylinder adapted to be mounted on the transmission shaft, and bushing engaging means for rotationally engaging said bushing with the transmission shaft, said bushing having a first predetermined number of bushing slots on its outer end;
   (b) a hub also having the shape of a hollow cylinder rotatable mounted on said bushing and substantially flush therewith, said hub having a ring-shaped flange with a second predetermined number of through holes for securely mounting a wheel thereto, said hub also having said first predetermined number of hub slots on its outer end which are in respectively radially aligned positions with said bushing slots;
   (c) a collar also having the shape of a hollow cylinder for rotationally engaging said bushing with said hub at their respective outer ends, said collar having said first predetermined number of collar protrusions at its inner end, each of said collar protrusions being dimensioned and positioned so as to closely fit into a respective pair of said bushing and hub slots when said bushing and hub slots are radially aligned, said collar having a cascading inner surface to form a collar shoulder near its inner end; and
   (d) a stud for inserting through said collar and securing to the transmission shaft via a screw means, said stud having a stud head wider than said shoulder of said collar shoulder so as to allow a spring to be placed between said stud head and said collar shoulder, whereby said collar is adapted to be slidably affixed to the transmission shaft by a cooperative action among said stud, said screw means, said shoulder and said spring to effectuate an easy engagement/disengagement of said collar protrusions with respect to said bushing and hub slots, and thus an engagement/disengagement between the transmission shaft and said wheel.

2. The clutch for electric carts according to claim 1, wherein said bushing slots and said hub slots are both rectangular slots cut through the entire thickness of said cylindrically shaped bushing and hub, respectively.

3. The clutch for electric cans according to claim 1, wherein said hub having a cascading inner surface to form a hub shoulder and said bushing having a complementary cascading outer surface to form a bushing shoulder, said hub shoulder and said bushing shoulder cooperatively form a stop to prevent said hub from slipping away from said bushing.

4. The clutch for electric cans according to claim 1, wherein said bushing engaging means comprising a key groove in said bushing adapted to cooperate with a matching key in the transmission shaft.

5. The clutch for electric cans according to claim 1, which has two bushing slots, two hub slots and two collar protrusions, said bushing and hub slots being in a substantially rectangular shape and cutting through an entire thickness of said hollow cylindrically shaped bushing and hub, respectively.

* * * * *